Aug. 23, 1932.   R. M. BARNHART   1,873,810
FRONT WHEEL DRIVE
Filed Oct. 17, 1930   2 Sheets-Sheet 2
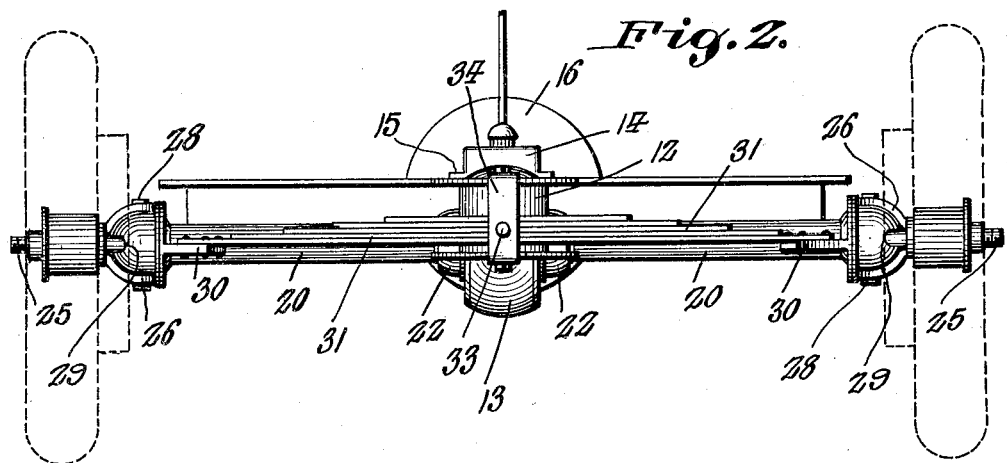
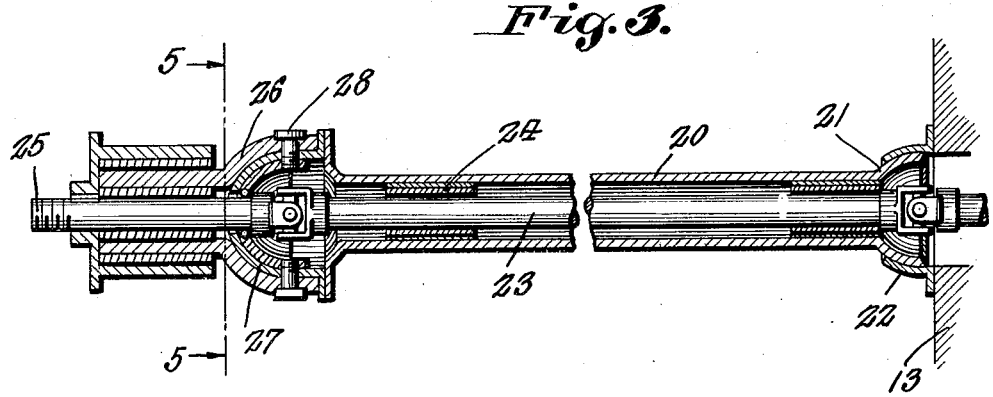
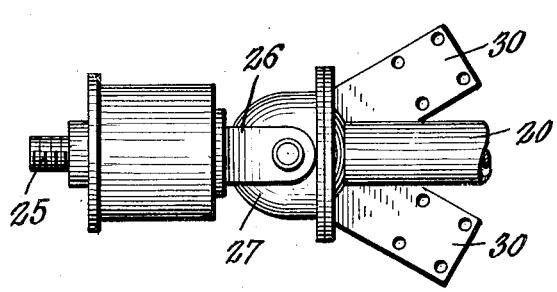
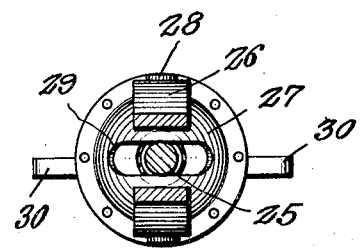
R. M. Barnhart, INVENTOR
BY Victor J. Evans
ATTORNEY Patented Aug. 23, 1932

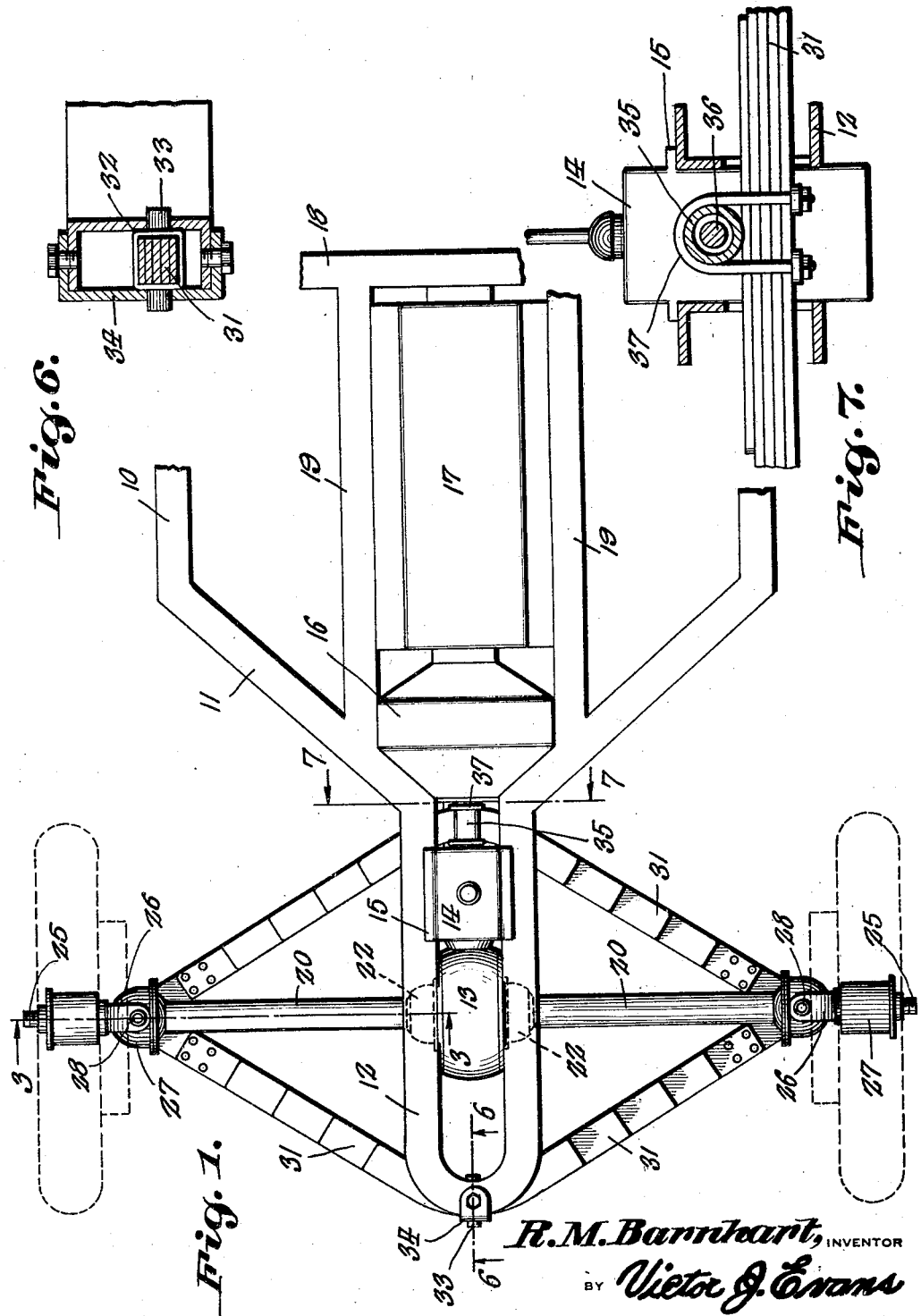

1,873,810

UNITED STATES PATENT OFFICE

ROBERT MARSHALL BARNHART, OF SPOKANE, WASHINGTON

FRONT WHEEL DRIVE

Application filed October 17, 1930. Serial No. 489,393.

This invention relates to front wheel drive mechanisms for motor vehicles and the like and which embodies among other characteristics universally connected power transmitting means for the driving wheels designed for the alleviating of road shock from the wheels and the transmission of same to the body and occupants of the vehicle.

An additional object of the invention contemplates the provision and arrangement of a multiplicity of transversely arranged springs for the drive mechanisms for the distribution of road shock back and forth between the steering wheels thereby obviating the usual hazardous reciprocating motion to the vehicle, frequently unseating the occupants.

An additional object of the invention consists of universal connections for the steering wheels of the vehicle permitting straight line drive with the differential.

With the above and other objects in view, the invention further consists of the following novel features and details of construction, to be hereinafter more fully described, illustrated in the accompanying drawings and pointed out in the appended claim.

In the drawings:—

Figure 1 is a top plan view of the present invention.

Figure 2 is a front elevation thereof.

Figure 3 is a fragmentary longitudinal sectional view taken on line 3—3 of Figure 1.

Figure 4 is an enlarged fragmentary top plan view of one of the wheel mountings.

Figure 5 is a sectional view taken on line 5—5 of Figure 3.

Figure 6 is a sectional view taken on line 6—6 of Figure 1 through the mounting for the front spring.

Figure 7 is a horizontal sectional view taken on line 7—7 of Figure 1 through the mounting for the intermediate portion of the rear transverse spring.

Referring to the drawings in detail wherein like characters of reference denote corresponding parts, the reference character 10 indicates generally the longitudinal side bars of an automobile chassis having their forward ends inwardly and obliquely disposed, as at 11, and in communication with the respective ends of a yoke-shaped portion 12 through which an appropriate portion of a differential housing 13 is projected. The transmission 14 having direct connection with the differential mechanism is supported upon the upper sides of the yoke portion 12 through the employment of flanges 15. The clutch housing 16 and motor 17 are aligned aft of the transmission 14 in numerical sequence, as suggested in Figure 1. A cross bar 18 having connection at its ends with the side bars of the chassis and in communication at intervals thereon with auxiliary longitudinal braces 19, carried by the inwardly inclined portions 11, cooperates in the supporting of the clutch housing and motor.

Axle housings 20, arranged upon opposite sides of the differential 13, terminate to provide bell ends 21 for universal association with relation to ball cups 22 arranged upon opposite sides of the differential whereby vertical movement will be permitted thereto after the manner of the arms of a semaphore signal apparatus. Axles 23, journaled within bearings 24 arranged at intervals within each of the axle housings 20, are designed for universal connection at their ends with the drive shaft of the differential and the stub axles 25 for the steering wheels. The wheel assemblages are each provided with companion oppositely disposed arms 26 conforming to the general outline of the housing covers 27 for the universal joint connections between the axles 23 and the stub axles 25.

Pivot or king bolts 28 are passed through the immediate overlapping portions of the arms 26 and housing covers 27 and from which the steering wheels may be turned in the usual radius by movement of the stub axles 25 through slots 29 in the covers 27.

Anchorage plates 30, carried by and obliquely disposed in the manner suggested in Figure 4 of the drawings upon the axle housings 20, have rigidly connected therewith the ends of the multiple transverse springs 31 arranged in the manner shown upon opposite sides of the differential housing. The intermediate portions of the transverse springs disposed in advance and to the rear of the differential are coupled or otherwise connected with the yoke portion 12 of the vehicle chassis, substantially as illustrated in Figures 6 and 7 of the drawings respectively. The intermediate portion of the front transverse spring is provided with a boxing 32 having trunnions 33 outwardly projecting therefrom from diametrically opposite sides thereof which are journaled within the bottom wall of the cross section channel shaped chassis bar and the oppositely disposed wall of a U-shaped saddle plate 34 having the respective ends thereof disposed in overlapping relation with the fins or flanges of the chassis bar. In this manner it will be noted that road shock may be transmitted back and forth between the steering wheels until completely absorbed instead of the shock being transmitted upwardly to the vehicle body and occupants. The housing 35 for the connecting shaft 36 between the transmission and flywheel, not shown, with the clutch housing 16, has supported upon the upper portion thereof a pair of reversely disposed U-bolts 37 employed in the usual manner for coupling the intermediate portions of the leaves composing the other transverse spring. The housing 35 may turn upon the shaft 36 and the trunnions 33 of the boxing 32 may turn in the saddle plate 34. In view of the fact that the springs 31 are attached to the housing 35 and pass through the boxing 32, the said springs may rock upon the axis of the shaft 36 and trunnions 33.

In this manner the usual longitudinal dipping action experienced in the employment of single transverse springs will be obviated thereby stabilizing the chassis and body and rendering the drive mechanism full floating.

From the foregoing, it is understood that the several universal connections established at the instances mentioned will coact in conjunction with the transverse springs in the absorbing of road shocks to a greater degree than has been accomplished heretofore and in so doing strain is relieved from the differential in order that the full benefit of the power may be derived therefrom.

The invention is susceptible of various changes in its form, proportions and minor details of construction and the right is herein reserved to make such changes as properly fall within the scope of the appended claim.

Having described the invention, what is claimed is:

A front wheel drive for a motor vehicle comprising in combination with a chassis frame, a transmission housing mounted upon the frame, an engine shaft entering said housing, a housing sleeve mounted upon the engine shaft at one side of the transmission housing, a yoke pivotally connected with the chassis frame at the opposite side of the transmission housing, the pivot of the yoke being in alignment with the axis of the shaft, sets of springs attached to the housing sleeve and yoke respectively, the springs of the respective sets having ends converging toward each other, a differential housing located between the sets of springs and engaging the transmission housing, and axle housings pivotally connected at their inner ends at opposite sides of the differential housing and connected at their outer ends with the ends of said springs.

In testimony whereof I affix my signature.
ROBERT MARSHALL BARNHART.